United States Patent
Rey

(10) Patent No.: US 11,811,578 B1
(45) Date of Patent: Nov. 7, 2023

(54) FRAME SYNCHRONIZATION DETECTION WITH FREQUENCY ESTIMATION

(71) Applicant: Cypress Semiconductor Corporation, San Jose, CA (US)

(72) Inventor: Claudio Rey, Chandler, AZ (US)

(*) Notice: Subject to any disclaimer, the term of this patent is extended or adjusted under 35 U.S.C. 154(b) by 0 days.

(21) Appl. No.: 17/895,992

(22) Filed: Aug. 25, 2022

(51) Int. Cl.
*H04L 27/26* (2006.01)
*H04L 25/02* (2006.01)

(52) U.S. Cl.
CPC ...... *H04L 27/2675* (2013.01); *H04L 25/0204* (2013.01); *H04L 25/0224* (2013.01)

(58) Field of Classification Search
CPC ............ H04L 25/0204; H04L 25/0224; H04L 27/2675
See application file for complete search history.

(56) References Cited

U.S. PATENT DOCUMENTS

| | | | | |
|---|---|---|---|---|
| 6,058,150 | A | * | 5/2000 | Ghosh ............... H04L 7/042 370/514 |
| 10,079,705 | B1 | * | 9/2018 | Sharpe ............. H04W 28/14 |
| 2002/0097820 | A1 | * | 7/2002 | Simmons .......... H04L 27/0014 375/344 |

* cited by examiner

*Primary Examiner* — David B Lugo

(57) ABSTRACT

A wireless device includes a receiver to receive a packet via one or more antennas. A frame synchronization detection circuit coupled to the receiver identifies a frame synchronization pattern within a portion of the packet. A correlation circuit coupled to the frame synchronization detection circuit computes, in response to the identifying of the frame synchronization pattern within the portion of the packet, a frequency offset using a correlation method. A frequency estimation correction circuit coupled to the correlation circuit determines, based on the frame synchronization pattern, a bias value, wherein the bias value corresponds to a data pattern within the frame synchronization pattern indicative of a frequency bias, and applies a correction to the frequency offset, wherein applying the correction to the frequency offset comprises modifying the frequency offset using the bias value.

20 Claims, 6 Drawing Sheets

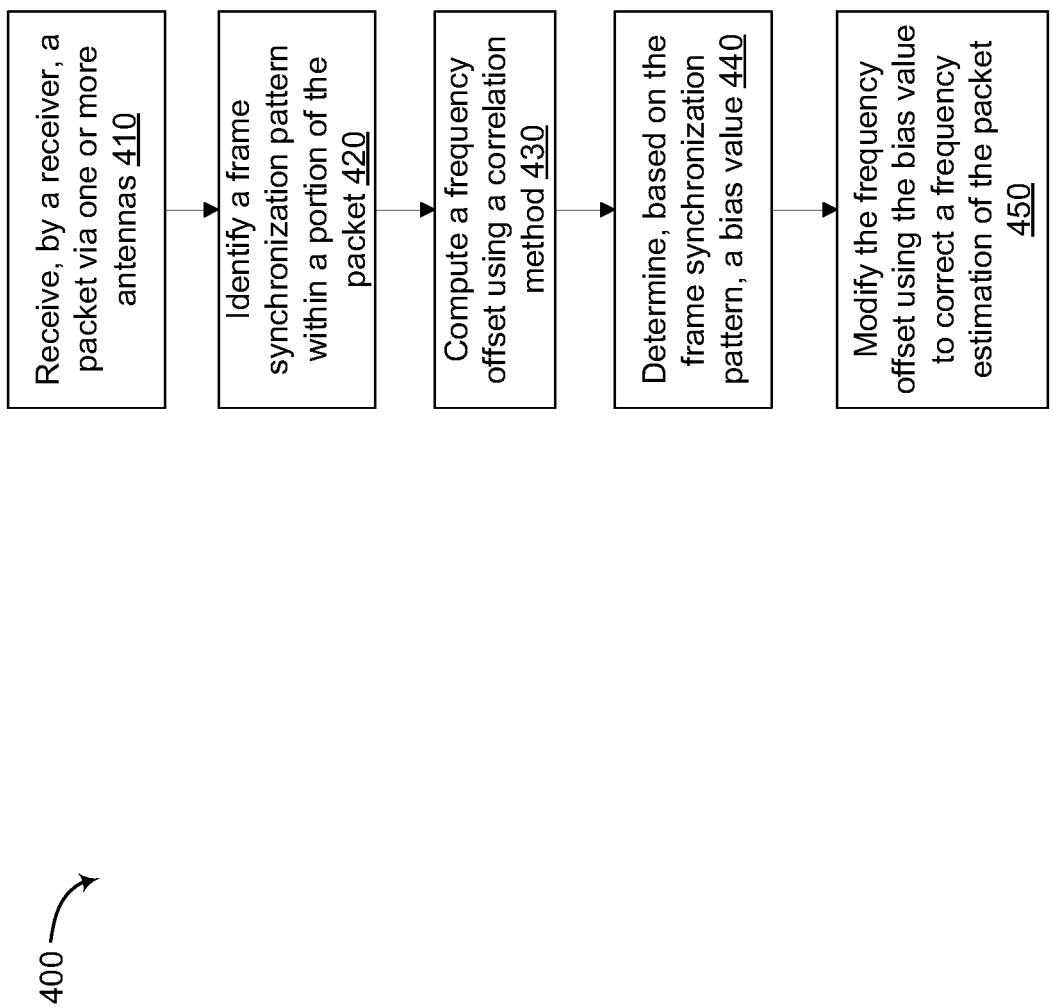

FRAME SYNCHRONIZATION DETECTION WITH FREQUENCY ESTIMATION

TECHNICAL FIELD

The present disclosure pertains to wireless networks and, more specifically, to frame synchronization detection of various electronic devices communicating wirelessly, e.g., via a Bluetooth (BT) or Bluetooth® Low Energy (BLE) connection.

BACKGROUND

Personal area networks (PANs), such as Bluetooth (BT), Bluetooth® Low Energy (BLE), Zigbee®, infrared, and the like, use the 2.4 GHz radio frequency band to provide a wireless connection for various personal industrial, scientific, and medical applications. PANs generally use a packet-based protocol and have an architecture that includes central devices (CDs) and peripheral devices (PDs). A CD can communicate with multiple PDs.

Typically, data is transferred between a CD and a specific PD during a time allocated for the specific PD-CD communication link. At a designated time, a PD can tune in to receive messages and data from the CD and, in turn, communicate data to the CD. Additionally, a CD can sometimes use a broadcast mode, in which the same data is communicated to multiple PDs simultaneously. BLE networks have communication ranges similar to BT networks but have a considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

BRIEF DESCRIPTION OF THE DRAWINGS

FIG. 4 is a flow diagram of an example method for frame synchronization detection with frequency estimation, in accordance with some implementations.

DETAILED DESCRIPTION

Figure 1A:
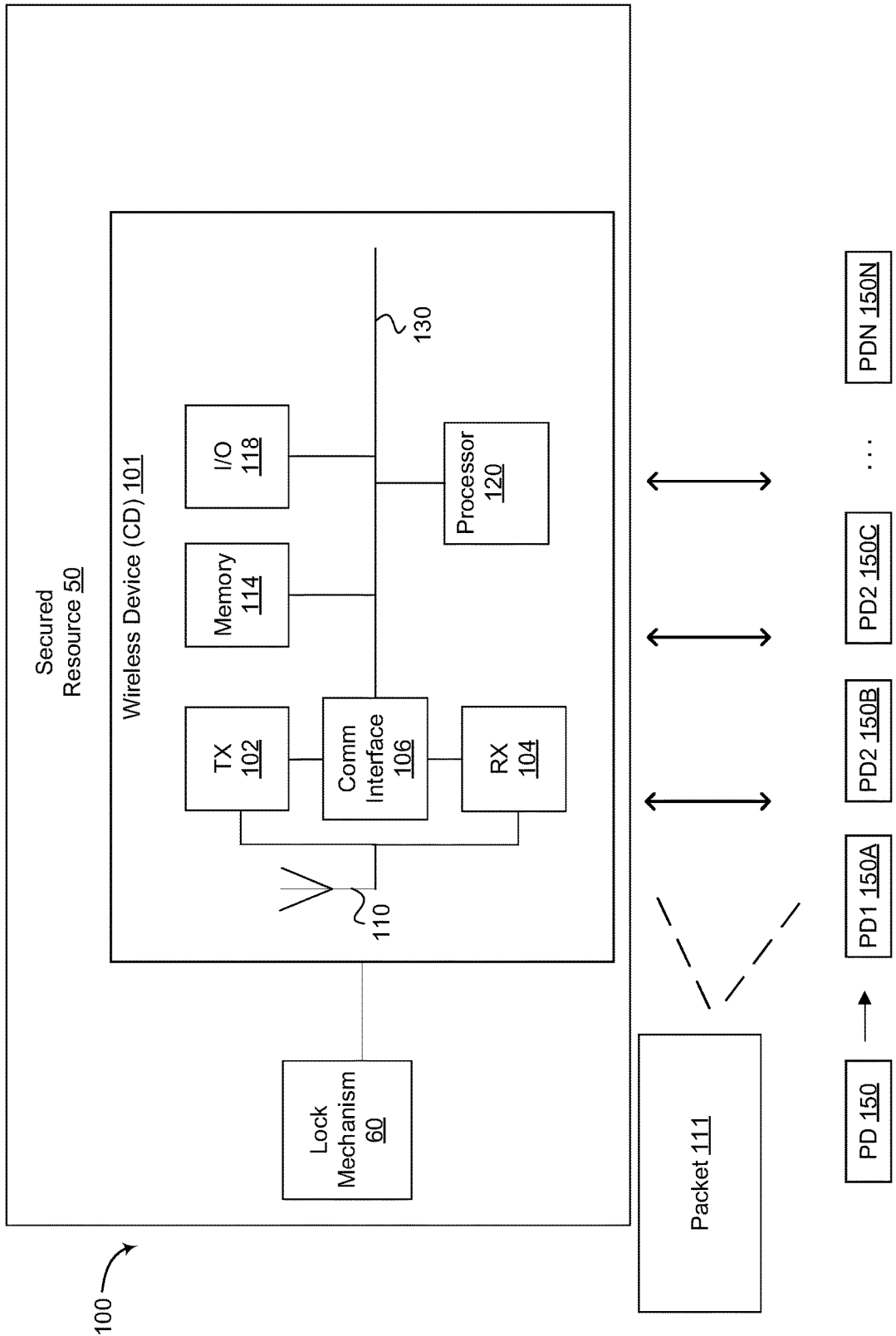
FIG. 1A is a block diagram of an example system for frame synchronization detection with frequency estimation between a wireless device acting as a CD and a wireless device acting as a PD, in accordance with some implementations.

The following description sets forth numerous specific details, such as examples of specific systems, devices, components, methods, and so forth, in order to provide a good understanding of various embodiments of frame synchronization detection between wireless devices associated with a PAN. The disclosed principles may generally be applied to non-Gaussian Frequency Shift Keying (GFSK) modulation, even such modulations without frequency. Frame synchronization (or frame synch) detection may refer to detecting a frame delimiter, also referred to as a start frame delimiter (SFD), in a network packet that is identifying or signaling that data is to follow within a frame of the packet.

In certain PAN devices, frame synchronization detection can be used in order to aid in communication between wireless devices by identifying or signaling the data (i.e., payload data) that is to follow in a packet. Optionally, frame synchronization can also identify the sender of the packet. In certain PAN devices, frame synchronization can be used as part of BLE distance estimation, which was also previously known as BLE high accuracy distance measurement (HADM). BLE distance estimation is achieved through a phase-based distance ranging method, or through packet exchanges in round trip timing (RTT) estimation, or a combination thereof to provide localization between wireless devices. In one example, data patterns are used in RTT estimation to estimate the time of arrival (ToA) of a packet. In another example, BLE distance estimation can use the frequency estimated during the RTT estimation to synchronize the BLE distance estimation device to other BLE distance estimation devices through the correction of clocking errors and to estimate the phase during the phase ranging. Additionally, BLE distance estimation can use data patterns to estimate frequency for use in security features, such as intrusion detection models. As such, there is a need for a highly accurate frequency estimation in order to provide accurate phase distance ranging and localization services, as well as to improve security features for BLE distance estimation devices.

Frame synchronization detection can be carried out at a sample rate that is a simple multiple (e.g., 4, 6, 8, 12 megahertz (MHz)) of the data symbol rate (e.g., 1 or 2 megabits per second (Mbps)). The sample rate and the data symbol rate are typically a divided (e.g., sampling) rate of the crystal oscillator (XO) frequency (e.g., 24, 32, or 48 MHz). The subsequent processing of the data symbols may be straightforward in being performed at known XO-divided bit rates, and synchronization data patterns (e.g., digital "0s" and "1s") can be more easily correlated using bit decisions according to Boolean logic. Alternatively, signed soft symbols may be used to obtain more accurate results, in which case the correlation can be described as a number of summations and subtractions. Some deficiencies in these approaches include that receivers that operate at XO-divided bit rates can experience significant radio interference issues, e.g., in the form of disturbances, spurs, and/or noise that cause receiver de-sensing, e.g., impacts receiver sensitization. In BLE distance estimation devices and other PAN devices that implement ranging and localization services, as well as security features, these radio interference issues may be avoided by determining a more accurate frequency estimation from frame synchronization.

Aspects and implementations of the present disclosure address these and other limitations of the existing technology by enabling systems and methods of frame synchronization detection with accurate frequency estimation. In one example implementation, a receiver of a wireless device receives a packet over a communication channel wirelessly (e.g., via one or more antennas). A frame synchronization detection circuit that is coupled to the receiver identifies a frame synchronization pattern within a portion of the packet.

A correlation circuit coupled to the frame synchronization detection circuit computes, in response to identifying the frame synchronization pattern at the portion of the packet, a frequency offset using a correlation method. A frequency estimation correction circuit coupled to the correlation circuit determines, based on the frame synchronization pattern, a bias value, wherein the bias value corresponds to a data pattern within the frame synchronization pattern that is indicative of a frequency bias. The frequency estimation correction circuit further modifies the frequency offset using the bias value to correct a frequency estimation of the packet. Numerous other implementations and multiple variations of these implementations are discussed below.

Advantages of the present disclosure may include using bias indicator values (hereinafter referred to as bias values) in order to correct a frequency estimation and thus provide a much more accurate frequency estimation. The improved and more accurate frequency estimation can then be used, as described herein, in BLE distance estimation devices for localization and ranging services, as well as for security applications. More specifically, bias values can be summations of different data patterns found within a frame synchronization pattern, as described in more detail herein. Once the bias values are computed, the bias values can be used to adjust the frequency estimation to a more accurate frequency. Accounting for the bias that affects frequency can allow for an improved frequency estimation and thus provide for more accurate localization and ranging services in devices such as BLE distance estimation devices.

FIG. 1A is a block diagram of an example system for frame synchronization detection with frequency estimation between a wireless device 101 acting as a CD and a wireless device 150 acting as a PD, in accordance with some implementations. The system 100 can include a secured resource 50, e.g., that is secured using a lock mechanism 60, where the wireless device 150 is adapted to gain access to the secured resource 50 via the lock mechanism 60. The secured resource 50 can be, for example, a vehicle, a building, a residence, a garage, a shed, a vault, or the like. The secured resource 50 can also be a computer system, industrial equipment, or other items requiring secured access via the lock mechanism 60, which can be a digital locking mechanism, for example. In some embodiments, the lock mechanism is integrated together with the wireless device 101.

In some embodiments, the wireless device 150 is any one of multiple peripheral wireless devices PD1 150A, 150B, 150C . . . 150N, etc., as the wireless device 101 may be adapted to communicate with any or all of the peripheral wireless devices PD1 150A, 150B, 150C . . . 150N, etc. In some embodiments, the wireless device 101 is a mobile device such as a mobile phone, a smartphone, a pager, an electronic transceiver, a tablet, or the like. In some embodiments, the wireless device 150 can be adapted to gain access to the secured resource 50 by transmitting data encapsulated in a packet 111. The packet 111 can be transmitted from the wireless device 150 to the wireless device 101, as will be discussed in more detail. While the wireless device 101 is illustrated in detail, the wireless device 150 can also include the same or similar components as the wireless device 101, but are not repeated for simplicity.

In some embodiments, the wireless device 101 includes, but is not limited to, a transmitter 102 or TX (e.g., a PAN transmitter), a receiver 104 or RX (e.g., a PAN receiver), a communications interface 106, an antenna 110, a memory 114, one or more input/output (I/O) devices 118 (such as a display screen, a touch screen, a keypad, and the like), and a processor 120. These components may all be coupled to a communications bus 130. In some embodiments, the frequency offset, as described herein, is an offset (e.g., difference) between a frequency at the TX 102 and a frequency at the RX 104.

In some embodiments, a separate antenna is employed for each of the transmitter 102 and receiver 104, and so the antenna 110 is illustrated for simplicity. In some embodiments, the memory 114 includes storage to store instructions executable by processor 120 and/or data generated by the communications interface 106. In some embodiments, the one or more antennas (such as the antenna 110) described herein within various devices are used for PAN-based frequency bands, e.g., Bluetooth® (BT), BLE, Wi-Fi®, Zigbee®, Z-wave™, and the like.

In some embodiments, the communications interface 106 is integrated with the transmitter 102 and the receiver 104, e.g., as a front-end of the wireless device 101. The communication interface 106 may coordinate, as directed by the processor 120, to request/receive packets (e.g., the packet 111) from the peripheral wireless device 150. The communications interface 106 may further process data symbols received by the receiver 104 in a way that the processor 120 can perform further processing, including correcting frequency estimation by identifying a frame synchronization pattern within the samples of data values obtained from a frame of the packet 111, computing a frequency offset using a correlation method, determining a bias value in the identified frame synchronization pattern, and correcting the computed frequency offset by modifying the frequency offset using the bias value, as discussed herein.

Figure 1B:
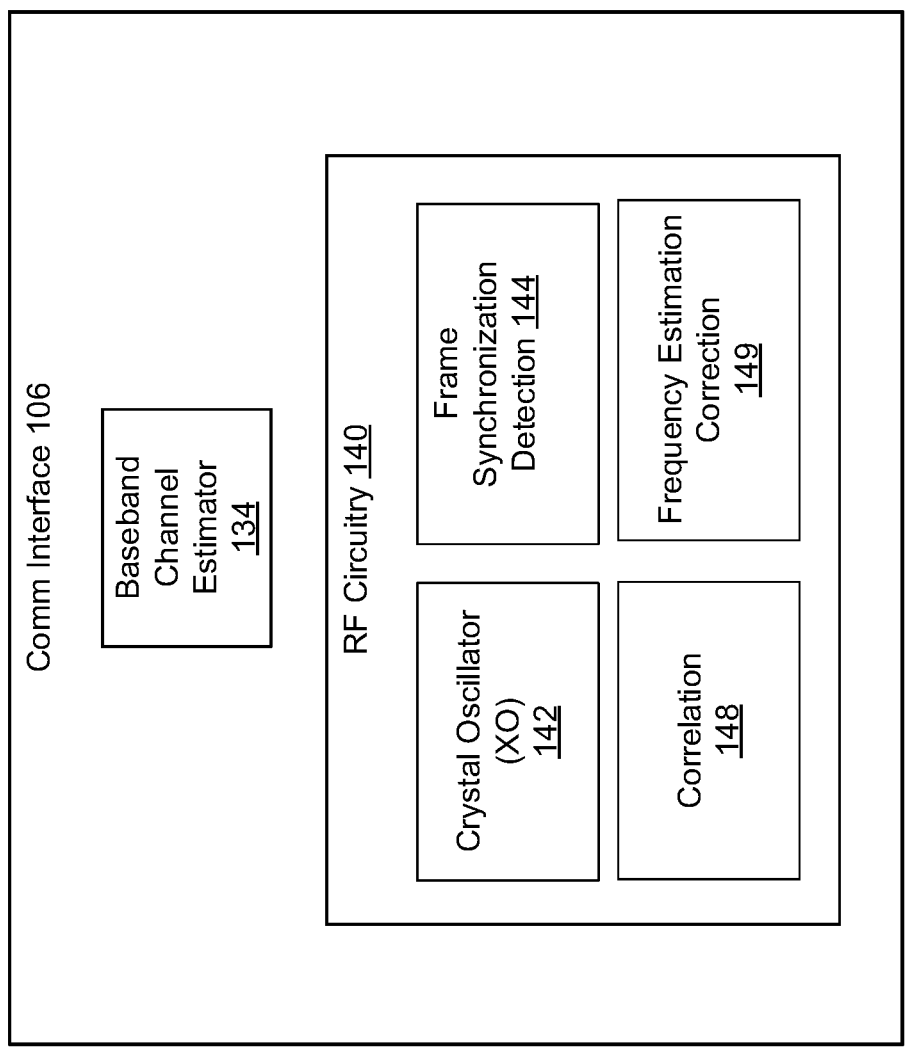
FIG. 1B is a simplified block diagram of the communication interface of the CD-based wireless device of FIG. 1A, in accordance with some implementations.

FIG. 1B is a simplified block diagram of the communication interface 106 of the CD-based wireless device 101 of FIG. 1A, in accordance with some implementations. In at least some embodiments, the communication interface 106 includes a baseband channel estimator 134 used to estimate, and thus, detect, a channel and enable the receiver 104 to receive packets over the channel. Estimating a channel may, for example, refer to estimating channel state information (CSI) and a received signal strength indicator (RSSI) for each channel. The receiver 104 may thus adjust the rate of sampling channel properties by the baseband channel estimator 134. Thus, the receiver 104 or the baseband channel estimator 134 may include a local oscillator (LO) that samples at particular bit rates for particular channels, which is often at a non-integer bit rate.

In some embodiments, the communication interface 106 includes RF circuitry 140, although the RF circuitry 140 discussed herein may also be coupled with the communication interface 106 and thus be located elsewhere within the frontend of the wireless device 101. In some embodiments, the RF circuitry 140 includes (or is coupled with) a crystal oscillator (XO) 142 and includes a frame synchronization detection circuit 144, a correlation circuit 148, and a frequency estimation correction circuit 149.

The XO 142 may provide a clock to govern sampling and processing in an XO-based frequency domain. In some embodiments, the RF circuitry 140 is implemented as a programmable processor, such as an application-specific integrated circuit (ASIC), field-programmable gate array (FPGA), a processing unit (such as a CPU or a GPU), or other microprocessor device that may include a combination of circuit-based hardware, logic, firmware, and/or software.

In some embodiments, the frame synchronization detection circuit 144 is configured to identify a frame synchronization pattern within a portion of a packet received via the receiver 104. The frame synchronization pattern can be a set of bits that include a pre-known data pattern that indicates or identifies that data is to follow within the frame of the packet. The correlation circuit 148 may be configured to compute a frequency offset using the data samples from the received packet. The frequency offset can be computed using a correlation method, as described herein with respect to FIGS. 2-3. The frequency estimation correction circuit 149 may be configured to determine one or more bias values within the identified frame synchronization pattern, as described herein with respect to FIG. 4. The frequency estimation correction circuit 149 may further modify the frequency offset using a mathematical equation that modifies the frequency offset with the one or more determined bias values to account for biases in the frame synchronization pattern that affects the frequency, as described herein.

Figure 1C:
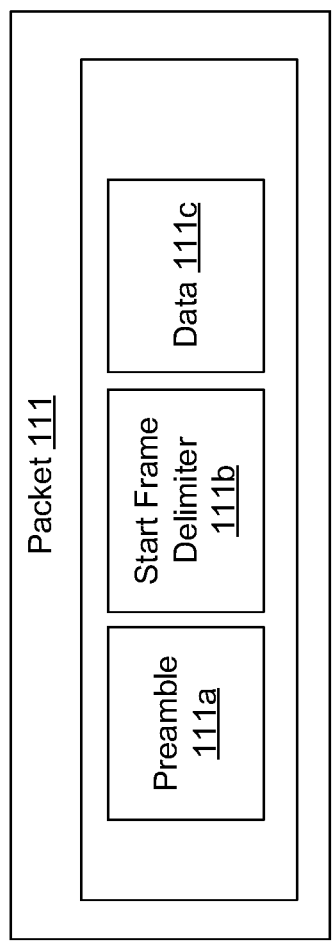
FIG. 1C is a simplified block diagram illustrating a packet received from a wireless device, in accordance with some implementations.

FIG. 1C is a simplified block diagram illustrating a packet 111 received from a wireless device (e.g., the PD 150 in FIG. 1A), in accordance with some implementations. As illustrated in FIG. 1C, the packet 111 can include, but is not limited to, a preamble 111*a*, a start frame delimiter 111*b*, and data 111*c*. The preamble 111*a* is typically a fixed number of bytes (e.g., seven bytes) that indicate or identify that data is to follow within a frame of a packet received by a receiver (e.g., the receiver 104 of FIG. 1A). The preamble 111*a* allows wireless devices (e.g., the wireless device 101 of FIG. 1A) to synchronize their receiver clocks with the transmitter clocks of wireless devices (e.g., the PD 150 in FIG. 1A). The start frame delimiter 111B is typically another fixed number of bytes (e.g., one byte) that indicates the end of the preamble 111*a* and the start of the frame with payload data (e.g., the data 111*c*).

Figure 2:
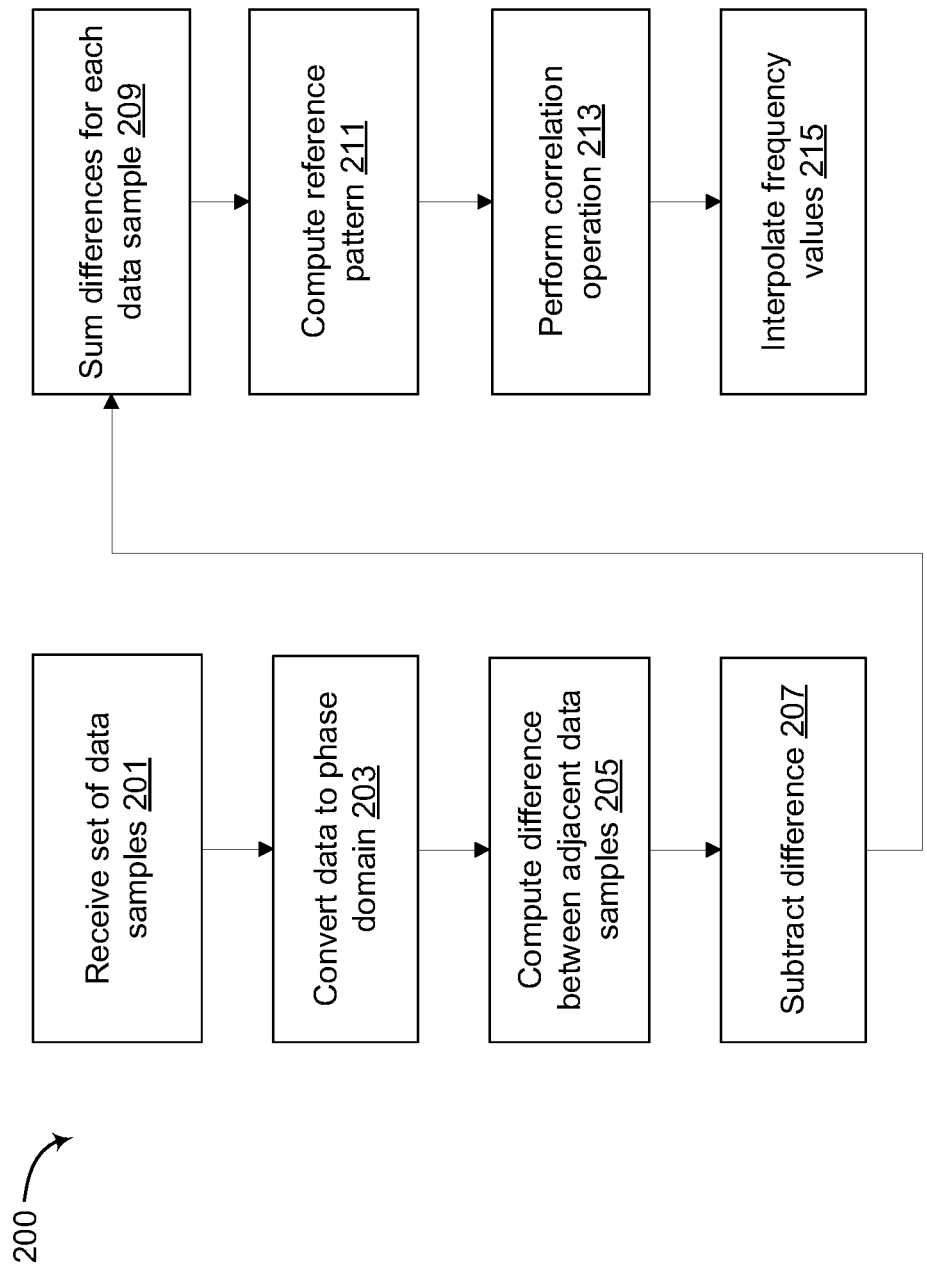
FIG. 2 is a flow diagram of an example method for estimating a frequency offset, in accordance with some implementations.

FIG. 2 is a flow diagram of an example method 200 for estimating a frequency offset, in accordance with some implementations. The method 200 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the communication interface 106 and/or the processor 120 of the wireless device 101 (e.g., as illustrated in FIGS. 1A-1B).

At operation 201, n data samples of a packet (e.g., the packet 111 of FIG. 1C) are received via a receiver (e.g., the receiver 104 of FIG. 1A) from a wireless device (e.g., the PD 150 of FIG. 1A). The data can be sampled at an integer rate (k) of a local oscillator (LO) bit rate. For example, the data can be sampled at a rate that is a simple multiple (e.g., 4, 6, 8, 12 MHz) of the data symbol rate (e.g., 1 or 2 Mbps), where the rates are a divided rate of the crystal oscillator (XO) frequency (e.g., at 24, 32, or 48 MHz).

The data samples can be used in order to obtain frequency estimation samples dS(n), i.e., the differential of the n data samples over one symbol S. For example, in some embodiments, at operation 203, the data samples of the packet are converted into the in-phase domain (e.g., using φ(n)). At operation 205, the difference between adjacent data samples can be computed. In some embodiments, computing the difference between adjacent samples is performed by calculating the differential of adjacent phase domain data sample values. For example, the difference can be computed using a mathematical equation that may be:

$$d\varphi(n) = \varphi(n) - \varphi(n-1).$$

At operation 207, for each difference between adjacent samples computed at operation 205, the difference a symbol away from each sample can be subtracted. For example, the difference a symbol away can be subtracted using a mathematical equation that may be:

$$dS\varphi(n) = \frac{d\varphi(n) - d\varphi(n-k)}{k}.$$

At operation 209, the differences for each data sample can be accumulated (e.g., summed up) in order to obtain the frequency estimation samples dS(n). In some embodiments, the differences are further scaled, using a value such as π (i.e., pi) and a modulation index h (e.g., a fixed value such as 0.5). For example, the differences can be accumulated and scaled to obtain dS(n) using a mathematical equation that may be:

$$dS(n) = \pi h \sum_{k=1}^{n} dS\varphi(k).$$

At operation 211, a reference frame synchronization pattern can be computed. In some embodiments, the reference frame synchronization pattern is a pattern that is to be used in a correlation operation. When the reference frame synchronization pattern matches a portion of the received data, the correlation operation generates a peak (in magnitude). The reference frame synchronization pattern can be computed, for example, using a mathematical equation that may be:

$$\text{Ref}(n) = \pi h(2\vartheta(n) - 1).$$

In the mathematical equation above, θ(n) can be pre-determined synchronization symbols that are found in BLE distance estimation devices.

At operation 213, a correlation operation can be performed in order to obtain a peak in the correlation and one or more values before and after the peak (e.g., to generate fractional timing correctional values to the peak). In some embodiments, the correlation operation is performed using a mathematical equation using the computed reference frame synchronization pattern and the computed frequency estimation samples dS(n) to compute a peak value. For example, the mathematical equation may be:

$$\text{Corr}(n) = \sum_{i=1}^{i=32} S(n - i*k) Ref(i),$$

where k is the data oversampling ratio used in the receiver.

The phase of the computed peak value is a first estimate of a frequency offset. However, the first estimate of the frequency offset can often be inaccurate (e.g., the timing of the peak is inaccurate). To improve the first estimate of the frequency offset (e.g., to improve the timing of the peak), the one or more values before and after the peak can also be computed, where, the one or more values are each a fractional timing correctional value of the computed peak value (e.g., +/−0.25, +/−0.5, etc.).

At operation 215, using the peak value in addition to the one or more values before and after the peak, an improved second estimate of the frequency offset can be computed. Computing the second estimate of the frequency offset can include performing a linear interpolation of the phase of the peak value and the phase of the one or more values before and/or after the peak. In some embodiments, a conventional linear interpolation mathematical method is used. In some embodiments, the linear interpolation can be performed using a parabolic fit function or other fit function. For example, with respect to parabolic fits, a stationary point of the parabola can be computed, e.g., the point where the derivative of the parabola is zero.

In some embodiments, the first estimate of the frequency offset (e.g., the peak value) and the second estimate of the frequency offset (e.g., the linear interpolation of the computed values between and after the peak and the peak value) are used to compute a further improved third estimate of the frequency offset. As described herein, the first and/or second estimates of frequency offsets can be inaccurate since certain biases in the frame synchronization pattern, which have not been accounted for, affect the frequency offsets. The first and/or second estimate of the frequency offset can thus be improved by using bias values that correct for biases, as described herein with respect to FIG. 4.

It should be understood that the above mathematical equations are intended as examples and that various other schemes of estimating frequency values are possible, e.g., using different specific equations, accounting for different (or additional) corrections, while still being within the scope of this disclosure.

Figure 3:
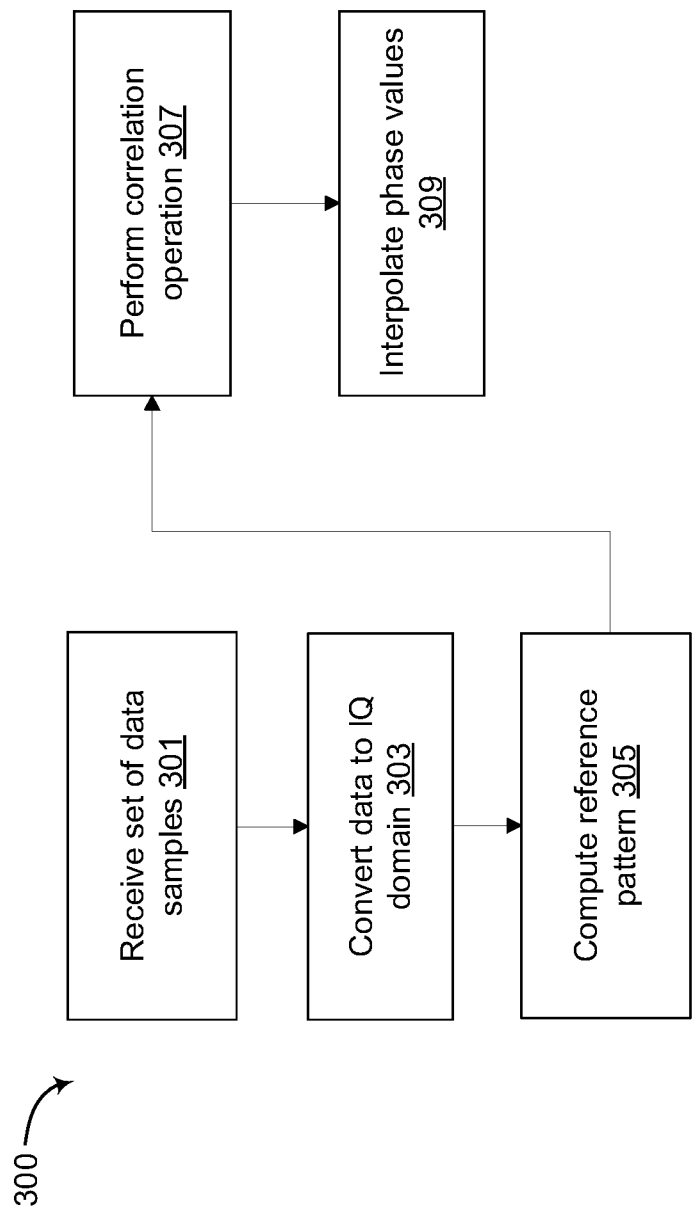
FIG. 3 is a flow diagram of an example method for estimating a frequency offset, in accordance with some implementations.

FIG. 3 is a flow diagram of an example method 300 for estimating a frequency offset, in accordance with some implementations. The method 300 may be performed by processing logic that can include firmware, hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the communication interface 106 and/or the processor 120 of the wireless device 101 (e.g., as illustrated in FIGS. 1A-1B).

At operation 301, n data samples of a packet (e.g., the packet 111 of FIG. 1C) are received via a receiver (e.g., the receiver 104 of FIG. 1A) from a wireless device (e.g., the PD 150 of FIG. 1A). The data can be sampled at an integer rate (k) of a local oscillator (LO) bit rate. For example, the data can be sampled at a rate that is a simple multiple (e.g., 4, 6, 8, 12 MHz) of the data symbol rate (e.g., 1 or 2 Mbps), where the rates are a divided rate of the crystal oscillator (XO) frequency (e.g., at 24, 32, or 48 MHz).

The data samples can be used in order to obtain frequency estimation samples dS(n), i.e., the differential of the n data samples over one symbol S. For example, in some embodiments, at operation 303, the data samples of the packet are converted into an in-phase and quadrature (IQ) domain. For example, the data samples dS(n) can be converted to the IQ domain using a mathematical equation that may be:

$$dIQ(n)=e^{jdS(n)}.$$

At operation 305, a reference frame synchronization pattern can be computed. In some embodiments, the reference frame synchronization pattern is a pattern that is to be used in a correlation operation. When the reference frame synchronization pattern matches a portion of the received data, the correlation operation generates a peak (in its magnitude). The reference frame synchronization pattern can be computed, for example, using a mathematical equation that may be:

$$Ref(n)=e^{-i\pi h(2\theta(n)-1)}.$$

In the mathematical equation above, θ(n) can be predetermined synchronization symbols that are found in BLE distance estimation devices.

At operation 307, a correlation operation can be performed in order to obtain a peak in the correlation and one or more values before and after the peak (e.g., to generate fractional timing correctional values to the peak). In some embodiments, the correlation operation is performed using a mathematical equation using the computed reference frame synchronization pattern and the computed frequency estimation samples dIQ(n) to compute a peak value. For example, the mathematical equation may be:

$$\mathrm{Corr}(n) = \sum_{k=1}^{i=32} dIQ(n - i*k) Ref(i),$$

where k is the data oversampling ratio used in the receiver.

The phase of the computed peak value is a first estimate of a frequency offset. However, the first estimate of the frequency offset can often be inaccurate (e.g., the timing of the peak is inaccurate). To improve the first estimate of the frequency offset (e.g., to improve the timing of the peak), the one or more values before and after the peak can also be computed, where the one or more values are each a fractional timing correctional value of the computed peak value (e.g., +/−0.25, +/−0.5, etc.).

At operation 309, using the peak ρ(n) value in addition to the one or more values before and after the peak, an improved second estimate of the frequency offset can be computed (in order to, e.g., correct the timing of the first estimate of the frequency offset Kφ(n) described at operation 307). Computing the second estimate of the frequency offset can include performing a linear interpolation of the phase of the peak value and the phase of the one or more values before and/or after the peak. In some embodiments, a conventional linear interpolation mathematical method is used. In some embodiments, the linear interpolation can be performed using a parabolic fit function or other fit function. For example, with respect to parabolic fits, a stationary point of the parabola can be computed, e.g., the point where the derivative of the parabola is zero. In some embodiments, each computed value (e.g., the peak ρ(n) value and the one or more values before and after the peak ρ(n) value) are converted to polar notation, $\rho(n)e^{i\varphi(n)}$, where φ(n) is an estimate of the frequency offset in phase measurement units. In some embodiments, Kφ(n) is a first (i.e., initial) estimate of the frequency, where K is a known conversion factor, such as 5e5/π. The computed values can be converted to polar notation using a mathematical equation that may be:

$$\rho(n)e^{i\varphi(n)}=\mathrm{Corr}(n).$$

In some embodiments, the first estimate of the frequency offset (e.g., the peak ρ(n) value) and the second estimate of the frequency offset (e.g., the linear interpolation of the computed values between and after the peak ρ(n) value and the peak ρ(n) value) are used to compute a further improved third estimate of the frequency offset. As described herein, the first and/or second estimates of frequency offsets can be inaccurate since certain biases in the frame synchronization pattern, which have not been accounted for, affect the frequency offsets. The first and/or second estimate of the frequency offset can thus be improved by using bias values that correct for biases, as described herein with respect to FIG. 4.

It should be understood that the above mathematical equations are intended as examples and that various other schemes of estimating frequency values are possible, e.g., using different specific equations, accounting for different (or additional) corrections, while still being within the scope of this disclosure.

FIG. 4 is a flow diagram of an example method 400 for frame synchronization detection with frequency estimation, in accordance with some implementations. The method 400 may be performed by processing logic that can include firmware, hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the communication interface 106 and/or the processor 120 of the wireless device 101 (e.g., as illustrated in FIGS. 1A-1B).

At operation 410, the processing logic receives a packet. The packet can be received via a receiver (e.g., the receiver 104 of FIG. 1A). In some embodiments, the packet is the packet 111 of FIG. 1A and/or FIG. 1C. The packet can include a preamble, a start frame delimiter, and payload data, as described herein.

At operation 420, the processing logic identifies a frame synchronization pattern. The frame synchronization pattern can be identified within a portion of the packet 111. In some embodiments, the frame synchronization pattern is a sequence of bits from the preamble 111a and/or start frame delimiter 111b portions of the packet. Identifying the frame synchronization pattern can include identifying a pre-known data pattern within the portion of the packet. The pre-known data pattern can be a set of bits in the sequence of bits from the preamble 111a, the start frame delimiter 111b portions of the packet, and/or a set of known symbols in a payload portion of the packet.

At operation 430, the processing logic computes a frequency offset. In some embodiments, the processing logic computes the frequency offset using a correlation method. For example, the processing logic can compute the frequency offset using the correlation method described with respect to FIG. 3. In some examples, the processing logic can compute the frequency offset using the correlation method described with respect to FIG. 4. In some examples, the processing logic can compute the frequency offset using other methods of correlation not specifically described herein or known at the present time.

At operation 440, the processing logic determines a bias value. In some embodiments, the processing logic determines the bias value based on the identified frame synchronization pattern. The bias value can reflect a particular data pattern within the identified frame synchronization pattern that is indicative of a frequency bias. In certain wireless devices, certain types of data patterns within the frame synchronization pattern can indicate frequency bias within the packet. In some embodiments, the data patterns includes one or more singleton patterns. The singleton pattern is a number of singleton zeros and/or singleton ones within the frame synchronization pattern (e.g., any isolated 0s or 1s in a sequence of bits, such as the following bolded 0s and 1s: "0 1 0 0 1 0 0 0"). In some embodiments, the data patterns includes one or more transition patterns. The transition pattern is a number of transition zeros and/or transition ones within the frame synchronization pattern (e.g., any transition 0s and 1s in a sequence of bits, such as the following bolded 0s and 1s: "0 1 0 0 1 0 0 0 0"). In some embodiments, the data patterns includes one or more non-transition patterns. The non-transition pattern is a number of non-transition zeros and/or non-transition ones within the frame synchronization pattern (e.g., any non-transition 0s and 1s in a sequence of bits, such as the following bolded 0s and 1s: "0 1 0 0 1 0 0 0 0").

In some embodiments, the processing logic detects, starting at an initial bit of the frame synchronization pattern and ending at a final bit of the frame synchronization pattern, one or more isolated 0 bits (e.g., singleton zeros). The processing logic can assign a fixed integer or non-integer value (e.g., 1) to each isolated 0 bit. The processing logic can compute the sum of each of the fixed values assigned to each isolated 0 bit. The processing logic can store the sum in a data structure stored in or otherwise accessible by the wireless device (e.g., residing in memory 114 illustrated in FIG. 1A). In some embodiments, the sum of the one or more isolated 0 bits can be referred herein as $S(1,1)$.

In some embodiments, the processing logic detects, starting at the initial bit of the frame synchronization pattern and ending at a final bit of the frame synchronization pattern, one or more isolated 1 bits (e.g., singleton ones). The processing logic can assign a fixed integer or non-integer value (e.g., 1) to each isolated 1 bit. The processing logic can compute the sum of each of the fixed values assigned to each isolated 1 bit. The processing logic can store the sum in a data structure stored in or otherwise accessible by the wireless device (e.g., residing in memory 114 illustrated in FIG. 1A). In some embodiments, the sum of the one or more isolated 1 bits can be referred herein as $S(1,2)$.

In some embodiments, the processing logic detects, starting at the initial bit of the frame synchronization pattern and ending at a final bit of the frame synchronization pattern, one or more transition zeros. The processing logic can assign a fixed integer or non-integer value (e.g., 1) to each transition zero. The processing logic can compute the sum of each of the fixed values assigned to each transition zero. The processing logic can store the sum in a data structure stored in or otherwise accessible by the wireless device (e.g., residing in memory 114 illustrated in FIG. 1A). In some embodiments, the sum of the one or more transition zeros can be referred herein as $S(2,1)$.

In some embodiments, the processing logic detects, starting at the initial bit of the frame synchronization pattern and ending at a final bit of the frame synchronization pattern, one or more transition ones. The processing logic can assign a fixed integer or non-integer value (e.g., 1) to each transition one. The processing logic can compute the sum of each of the fixed values assigned to each transition one. The processing logic can store the sum in a data structure stored in or otherwise accessible by the wireless device (e.g., residing in memory 114 illustrated in FIG. 1A). In some embodiments, the sum of the one or more transition ones can be referred herein as $S(2,2)$.

In some embodiments, the processing logic detects, starting at the initial bit of the frame synchronization pattern and ending at a final bit of the frame synchronization pattern, one or more non-transition zeros. The processing logic can assign a fixed integer or non-integer value (e.g., 1) to each non-transition zero. The processing logic can compute the sum of each of the fixed values assigned to each non-transition zero. The processing logic can store the sum in a data structure stored in or otherwise accessible by the wireless device (e.g., residing in memory 114 illustrated in FIG. 1A). In some embodiments, the sum of the one or more non-transition zeros can be referred herein as $S(3,1)$.

In some embodiments, the processing logic detects, starting at the initial bit of the frame synchronization pattern and ending at a final bit of the frame synchronization pattern, one or more non-transition ones. The processing logic can assign a fixed integer or non-integer value (e.g., 1) to each non-transition one. The processing logic can compute the sum of each of the fixed values assigned to each non-transition one. The processing logic can store the sum in a data structure stored in or otherwise accessible by the wireless device (e.g., residing in memory 114 illustrated in FIG. 1A). In some embodiments, the sum of the one or more non-transition ones can be referred herein as S(3,2).

In some embodiments, the processing logic can detect other data patterns within the frame synchronization pattern that are indicative of frequency bias. The processing logic can determine the number of detected one or more other data patterns (e.g., by maintaining a count of each of the one or more data patterns). The processing logic can store the number of detected one or more data patterns in a data structure stored in or otherwise accessible by the wireless device (e.g., residing in memory 114 illustrated in FIG. 1A), such as in a similar method as described above with respect to the singleton, transition, and/or non-transition patterns, or with any other applicable method.

In some embodiments, the bias value determined by the processing logic is a sum of each of the detected one or more data patterns (e.g., singleton, transition, non-transition, etc.) as described herein. In some embodiments, the bias value determined by the processing logic is a sum of a combination of the detected one or more data patterns (e.g., singleton, transition, non-transition, etc.) as described herein. For example, the processing logic can determine the bias value by computing at least one of: a sum of each of the fixed values assigned to each singleton zero pattern and computing a sum of each of each of the fixed values assigned to each singleton one pattern. In some embodiments, the processing logic can determine the bias value by computing a sum of each of the fixed values assigned to each transition zero pattern, computing a sum of each of the fixed values assigned to each transition one pattern, and computing at least one of: a sum of each of the fixed values assigned to each singleton zero pattern and a sum of each of the fixed values assigned to each singleton one pattern. In some embodiments, the processing logic can determine the bias value by computing a sum of each of the fixed values assigned to each non-transition zero pattern, computing a sum of each of the fixed values assigned to each non-transition one pattern, and computing at least one of: a sum of each of the fixed values assigned to each singleton zero pattern, a sum of each of the fixed values assigned to each singleton one pattern. In some embodiments, the processing logic can determine the bias value by computing a sum of each of the fixed values assigned to each transition zero pattern, computing a sum of each of the fixed values assigned to each transition one pattern, and computing at least one of: a sum of each of the fixed values assigned to each singleton zero pattern, a sum of each of the fixed values assigned to each singleton one pattern, a sum of each of the fixed values assigned to each non-transition zero pattern, and a sum of each of the fixed values assigned to each non-transition one pattern.

In some embodiments, the processing logic does not identify a data pattern indicative of a frequency bias within the frame synchronization pattern. In response to not identifying a data pattern within the frame synchronization pattern that is indicative of a frequency bias, the processing logic can use the computed frequency offset (as computed at operation 430) as the frequency without applying a correction as described herein with respect to operation 450.

At operation 450, the processing logic modifies the computed frequency offset (as computed at operation 430) using the bias value (as determined at operation 440) to correct a frequency of the packet. In some embodiments, the processing logic assigns (e.g., multiplies) a weighted value k (e.g., a fixed integer or non-integer value) by each bias value of a unique data pattern, i.e., a weighted value $k_1$ is assigned to the bias value for singleton patterns, a weighted value $k_2$ is assigned to the bias value bias value for transition patterns, and a weighted value $k_3$ is assigned to the bias value for non-transition patterns. In some embodiments, the processing logic uses a mathematical equation to estimate the correlation peak, such as:

$$\text{CorrPeak} = S(1,2)e^{jk_1} + S(1,1)e^{-jk_1} + S(2,2)e^{jk_2} + S(2,1)e^{-jk_2} + S(3,2)e^{jk_3} + S(3,1)e^{-jk_3}.$$

And from such estimate, a bias correction can be computed using a mathematical equation, such as:

$$\text{BiasCorrection} = \text{angle}(\text{CorrPeak})$$

In the above mathematical equation, the value S(1,2) is the determined bias value for singleton patterns of 1 bits; the value S(1,1) is the determined bias value for singleton patterns of 0 bits; the value S(2,2) is the determined bias value for transition patterns of 1 bits; the value S(2,1) is the determined bias value for transition patterns of 0 bits; the value S(3,2) is the determined bias value for non-transition patterns of 1 bits; and the value S(3,1) is the determined bias value for non-transition patterns of 0 bits. In some embodiments, there are other values not reflected in the above-described mathematical equation that can reflect determined bias values for other data patterns not described herein. For example, there can be a weighted value $k_4$ assigned to a bias value, a weighted value $k_5$ assigned to another bias value, etc.

In some embodiments, the processing logic can use another mathematical equation to compute an estimate of the bias value, such as:

$$\text{BiasCorrection} = l_1(S(1,2) - S(1,1)) + l_2(S(2,2) - S(2,1)) + l_3(S(3,2) - S(3,1)).$$

In the above mathematical equation, $l_1$, $l_2$, and $l_3$ are estimated empirically based on offline testing and can be predetermined/preconfigured values. Each of the values S(1,2), S(1,1), S(2,2), S(2,1), S(3,2), and S(3,1) can be computed in a similar method as described herein above. In some embodiments, the processing logic removes (e.g., subtracts) the correction from the computed correlation peak to compute a corrected frequency offset using the frequency offset Freq computed at operation 430 and a unit conversion factor, K. In some embodiments, such as with BLE, the unit conversion factor (to Hz) is $500.000/\pi$. In some embodiments, the mathematical equation to remove (e.g., subtract) the correction to the computed correlation peak to compute the corrected frequency offset is:

$$\widetilde{Freq} = K(\varphi - \text{BiasCorrection}).$$

In some embodiments, the processing logic can enable access by a wireless device (e.g., the wireless device 150 of FIG. 1) to a secured resource. In some embodiments, the secured resource can enclose another wireless device (e.g., a receiving device, such as the wireless device 101 of FIG. 1). In some embodiments, the wireless device and/or the another wireless device can be on top or otherwise coupled to the secured resource. The processing logic can enable access to the wireless device (e.g., to a user of the wireless device) in response to determining a distance between the wireless device and the secured resource enclosing another wireless device, using, e.g., a distance ranging method. In some embodiments, enabling access can include determining that a frequency offset associated with a frame synchronization pattern within a packet received from the wireless device matches the corrected frequency offset within a threshold level of accuracy. In some embodiments, the processing logic can deny access to the wireless device (e.g., to a user of the wireless device) in response to determining the distance between the wireless device and the secured resource enclosing the another wireless device, using, e.g., a distance ranging method. In some embodiments, denying access can include determining that the frequency offset associated with the frame synchronization pattern within the packet received from the wireless device does not match the corrected frequency offset within the threshold level of accuracy.

FIGS. 2-4 are not intended to limit the methods described therein to certain combinations, permutations, or assignment of actors, i.e., whether a PD or CD actually performs a particular operation. Rather, they are meant to be indicative of some implementations of this disclosure, and one skilled in the art will recognize that some operations may be rearranged for particular applications, some operations need not always be performed, some operations may be omitted, etc.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine-readable, computer accessible, or computer-readable medium, which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and/or other example language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A system comprising:
   a wireless device; and
   one or more antennas, the wireless device comprising:
   a receiver to receive a packet via the one or more antennas;
   a frame synchronization detection circuit coupled to the receiver to identify a frame synchronization pattern within a portion of the packet;
   a correlation circuit coupled to the frame synchronization detection circuit to compute, in response to the identifying of the frame synchronization pattern, a frequency offset using a correlation method; and
   a frequency estimation correction circuit coupled to the correlation circuit to:
   determine, based on the frame synchronization pattern, a bias value, wherein the bias value corresponds to a data pattern within the frame synchronization pattern indicative of a frequency bias; and
   apply a correction to the frequency offset, wherein applying the correction to the frequency offset comprises modifying the frequency offset using the bias value.

2. The system of claim 1, further comprising:
   a processing device, operatively coupled with the wireless device, to perform operations comprising:
   determining a distance between the wireless device and another wireless device using the corrected frequency offset; and
   responsive to determining the distance, granting access to a secured resource.

3. The system of claim 1, further comprising:
a processing device, operatively coupled with the wireless device, to perform operations comprising:
determining a distance between the wireless device and another wireless device using the corrected frequency offset; and
responsive to determining the distance, denying access to a secured resource.

4. The system of claim 1, wherein to identify the frame synchronization pattern, the frame synchronization detection circuit is further to identify a pre-known data pattern within the portion of the packet indicative of a start of a frame in the packet, wherein the pre-known data pattern comprises a plurality of bits.

5. The system of claim 1, wherein to determine, based on the frame synchronization pattern, the bias value, the frequency estimation correction circuit is further to:
use the data pattern within the frame synchronization pattern to determine a sum of one or more transition zero patterns, determine a sum of one or more transition one patterns, and determine at least one of:
a sum of one or more singleton zero patterns;
a sum of one or more singleton one patterns;
a sum of one or more non-transition zero patterns, and
a sum of one or more non-transition one patterns.

6. The system of claim 1, wherein to modify the frequency offset using the bias value, the frequency estimation correction circuit is further to:
multiply the bias value by a corresponding weight value, wherein multiplying the bias value by the corresponding weight results in a first value; and
add the frequency offset to the first value.

7. A method of operating a wireless device, the method comprising:
receiving a packet over a communication channel;
identifying a frame synchronization pattern within a portion of the packet;
in response to the identifying of the frame synchronization pattern, computing a frequency offset using a correlation method;
determining, based on the frame synchronization pattern, a bias value, wherein the bias value corresponds to a data pattern within the frame synchronization pattern indicative of a frequency bias; and
applying a correction to the frequency offset, wherein applying the correction to the frequency offset comprises modifying the frequency offset using the bias value.

8. The method of claim 7, wherein identifying the frame synchronization pattern comprises identifying a pre-known data pattern within the portion of the packet indicative of a start of a frame in the packet, wherein the pre-known data pattern comprises a plurality of bits.

9. The method of claim 7, wherein computing the frequency offset using the correlation method comprises:
obtaining a sampled bit stream of data from the packet at an integer rate of a bit rate;
identifying one or more data samples of the sampled bit stream from the packet, wherein the data samples are converted into in-phase values;
determining a peak value associated with the one or more data samples; and
interpolating the peak value.

10. The method of claim 7, wherein computing the frequency offset using the correlation method comprises:
obtaining a sampled bit stream of data from the packet at an integer rate of a bit rate;
identifying one or more data samples of the sampled bit stream from the packet, wherein the one or more data samples are converted into quadrature values;
determining a peak value associated with the one or more data samples; and
interpolating the peak value.

11. The method of claim 7, wherein determining, based on the frame synchronization pattern, the bias value comprises:
using the data pattern within the frame synchronization pattern to determine at least one of:
a sum of one or more singleton zero patterns; and
a sum of one or more singleton one patterns.

12. The method of claim 7, wherein determining, based on the frame synchronization pattern, the bias value comprises:
using the data pattern within the frame synchronization pattern to determine a sum of one or more transition zero patterns, determine a sum of one or more transition one patterns, and determine at least one of:
a sum of one or more singleton zero patterns; and
a sum of one or more singleton one patterns.

13. The method of claim 7, wherein determining, based on the frame synchronization pattern, the bias value comprises:
using the data pattern within the frame synchronization pattern to determine a sum of one or more non-transition zero patterns, determine a sum of one or more non-transition one patterns, and determine at least one of:
a sum of one or more singleton zero patterns; and
a sum of one or more singleton one patterns.

14. The method of claim 7, wherein determining, based on the frame synchronization pattern, the bias value comprises:
using the data pattern within the frame synchronization pattern to determine a sum of one or more transition zero patterns, determine a sum of one or more transition one patterns, and determine at least one of:
a sum of one or more singleton zero patterns;
a sum of one or more singleton one patterns;
a sum of one or more non-transition zero patterns; and
a sum of one or more non-transition one patterns.

15. The method of claim 7, wherein modifying the frequency offset using the bias value further comprises:
multiplying the bias value by a corresponding weight value, wherein multiplying the bias value by the corresponding weight value results in a first value; and
adding the frequency offset to the first value.

16. A wireless device comprising:
a receiver to receive a packet over a communication channel;
a frame synchronization detection circuit coupled to the receiver to identify a frame synchronization pattern within a portion of the packet;
a correlation circuit coupled to the frame synchronization detection circuit to compute, in response to the identifying of the frame synchronization pattern, a frequency offset using a correlation method; and
a frequency estimation correction circuit coupled to the correlation circuit to determine, based on the frame synchronization pattern, a bias value, wherein the bias value corresponds to a data pattern within the frame synchronization pattern indicative of a frequency bias, and to apply a correction to the frequency offset, wherein applying the correction to the frequency offset comprises modifying the frequency offset using the bias value.

17. The wireless device of claim 16, wherein to identify the frame synchronization pattern, the frame synchronization detection circuit is further to identify a pre-known data pattern within the portion of the packet indicative of a start of a frame in the packet, wherein the pre-known data pattern comprises a plurality of bits.

18. The wireless device of claim 16, wherein to determine, based on the frame synchronization pattern, the bias value, the frequency estimation correction circuit is further to:
   use the data pattern within the frame synchronization pattern to determine at least one of:
   a sum of one or more singleton zero patterns; and
   a sum of one or more singleton one patterns.

19. The wireless device of claim 16, wherein to determine, based on the frame synchronization pattern, the bias value, the frequency estimation correction circuit is further to:
   use the data pattern within the frame synchronization pattern to determine a sum of one or more transition zero patterns, determine a sum of one or more transition one patterns, and determine at least one of:
   a sum of one or more singleton zero patterns;
   a sum of one or more singleton one patterns;
   a sum of one or more non-transition zero patterns; and
   a sum of one or more non-transition one patterns.

20. The wireless device of claim 16, wherein to modify the frequency offset using the bias value, the frequency estimation correction circuit is further to:
   multiply the bias value by a corresponding weight value, wherein multiplying the bias value by the corresponding weight results in a first value; and
   add the frequency offset to the first value.

* * * * *